(12) United States Patent
Yabuzaki et al.

(10) Patent No.: US 7,842,643 B2
(45) Date of Patent: Nov. 30, 2010

(54) EXHAUST GAS PURIFYING CATALYST

(75) Inventors: Yuji Yabuzaki, Kakegawa (JP); Kenichi Taki, Kakegawa (JP); Akimasa Hirai, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 12/442,825

(22) PCT Filed: Sep. 19, 2007

(86) PCT No.: PCT/JP2007/068176

§ 371 (c)(1),
(2), (4) Date: Mar. 25, 2009

(87) PCT Pub. No.: WO2008/038552

PCT Pub. Date: Apr. 3, 2008

(65) Prior Publication Data

US 2010/0016150 A1    Jan. 21, 2010

(30) Foreign Application Priority Data

Sep. 26, 2006  (JP) .............................. 2006-260748

(51) Int. Cl.
*B01J 23/10* (2006.01)
(52) U.S. Cl. .................. 502/303; 502/304; 502/333; 502/339
(58) Field of Classification Search .................. None
See application file for complete search history.

(56) References Cited

U.S. PATENT DOCUMENTS

2001/0031699 A1 * 10/2001 Matsumoto et al. ......... 502/303
2003/0100447 A1   5/2003 Deeba et al.
2003/0147796 A1   8/2003 Suga et al.
2004/0043897 A1 * 3/2004 Tadao .......................... 502/302
2006/0128562 A1   6/2006 Miyoshi et al.

FOREIGN PATENT DOCUMENTS

| EP | 0716877 | 6/1996 |
|---|---|---|
| JP | 8224449 | 9/1996 |
| JP | 10501737 | 2/1998 |
| JP | 2003-190790 | 7/2003 |
| JP | 2003-326164 | 11/2003 |
| JP | 2005-506900 | 3/2005 |
| JP | 2006-159159 | 6/2006 |
| WO | 2005077497 | 8/2005 |

* cited by examiner

*Primary Examiner*—Melvin C Mayes
*Assistant Examiner*—Bijay S Saha
(74) *Attorney, Agent, or Firm*—Davis & Bujold, P.L.L.C.

(57) ABSTRACT

An exhaust gas purifying catalyst exhibiting high catalytic performance and restraining an amount of noble metals used is provided. An exhaust gas purifying catalyst has a catalyst substrate and a catalyst coating layer formed on the catalyst substrate. The catalyst coating layer has a layered structure including an inside layer containing (a-1) Pd, (a-2) Pt, and (a-3) an inorganic oxide, and an outside layer containing (b-1) a noble metal and (b-2) an inorganic oxide. A part of (a-3) the inorganic oxide carries Pd and Pt so that a weight ratio Pd/Pt is within a range of 8 to 12, whereas the other part of (a-3) the inorganic oxide carries Pd and Pt so that a weight ratio Pd/Pt is within a range of 4 to 6 or within a range of 18 to 22.

9 Claims, 1 Drawing Sheet

EXHAUST GAS PURIFYING CATALYST

This application is a National Stage completion of PCT/JP2007/068176 filed Sep. 19, 2007, which claims priority from Japanese patent application Ser. No. 2006-260748 filed Sep. 26, 2006.

TECHNICAL FIELD

The present invention relates to an exhaust gas purifying catalyst that removes toxic substances contained in exhaust gas from an internal combustion engine of an automobile, a motorcycle and others.

BACKGROUND ART

Conventionally, there have been proposed a number of catalysts used for purifying exhaust gas from an internal combustion engine of an automobile and others.

These days, most of the catalysts are three-way catalysts that purify HC, CO and NOx at the same time.

As such a three-way catalyst, a two-layer type having an inside layer containing Pd and an outside layer containing Rh is known (see Patent Literature 1).
Patent Literature 1: Unexamined Japanese Patent Publication No. 10-501737

In recent years, control on exhaust emissions from an automobile is tightened, which demands a further reduction of HC, CO, and NOx emissions. However, conventional exhaust gas purifying catalysts cannot always sufficiently comply with the tightened control requirements. In addition, when an amount of noble metals used is increased to improve catalytic performance, a price of the exhaust gas purifying catalyst has to be raised, which is a problem.

The present invention has been made in view of the above circumstances. An object of the present invention is to provide an exhaust gas purifying catalyst which exhibits high catalytic performance and is capable of restraining an amount of noble metals used.

MEANS TO SOLVE THE PROBLEMS

The present invention provides an exhaust gas purifying catalyst having a catalyst substrate and a catalyst coating layer formed on the catalyst substrate. The catalyst coating layer has a layered structure including an inside layer a containing (a-1) Pd, (a-2) Pt, and (a-3) an inorganic oxide; and an outside layer b containing (b-1) a noble metal and (b-2) an inorganic oxide.

A part of (a-3) the inorganic oxide carries Pd and Pt so that a weight ratio Pd/Pt is within a range of 8 to 12, whereas the other part of (a-3) the inorganic oxide carries Pd and Pt so that a weight ratio Pd/Pt is within a range of 4 to 6 or within a range of 18 to 22.

In the exhaust gas purifying catalyst of the present invention, there exist both portions in the inside layer a, one portion is where a weight ratio Pd/Pt of Pd and Pt is within a range of 8 to 12, and the other portion is where a weight ratio Pd/Pt of Pd and Pt is within a range of 4 to 6 or within a range of 18 to 22. Due to this, the exhaust gas purifying catalyst of the present invention excels especially in catalytic performance, which requires less amount of Pd and Pt to be used and makes it possible to restrain an amount of noble metals used.

The inside layer a may, for example, be configured to contain (a-3) the inorganic oxides which carries Pd and Pt so that a weight ratio Pd/Pt is within a range of 8 to 12, and (a-3) the inorganic oxides which carries Pd and Pt so that a weight ratio Pd/Pt is within a range of 4 to 6 or within a range of 18 to 22, in an intermingled manner.

Alternatively, the inside layer a may be further sectioned into a first inside layer and a second inside layer, so that in the first inside layer, a weight ratio Pd/Pt of Pd and Pt which are carried by (a-3) the inorganic oxide is within a range of 8 to 12, whereas in the second inside layer, a weight ratio Pd/Pt of Pd and Pt which are carried by the component of (a-3) is within a range of 4 to 6 or within a range of 18 to 22. The above constitution can improve an exhaust gas purifying performance.

There is no particular limitation to a positional relationship between the first inside layer and the second inside layer. For example, the first inside layer may be arranged at a lower side (a side closer to the catalyst substrate) with the second inside layer arranged at an upper side, and an inverse arrangement is also possible.

Further alternatively, the inside layer a may include an upstream portion located upstream relative to a flow direction of exhaust gas and a downstream portion located downstream relative to the flow direction of exhaust gas, so that in the upstream portion, a weight ratio Pd/Pt of Pd and Pt which are carried by the component of (a-3) is within a range of 8 to 12, whereas in the downstream portion, a weight ratio Pd/Pt of Pd and Pt which are carried by the component of (a-3) is within a range of 4 to 6 or within a range of 18 to 22.

Still alternatively, the inside layer a may include an upstream portion located upstream relative to a flow direction of exhaust gas and a downstream portion located downstream relative to the flow direction of exhaust gas, so that in the downstream portion, a weight ratio Pd/Pt of Pd and Pt which are carried by the component of (a-3) is within a range of 8 to 12, whereas in the upstream portion, a weight ratio Pd/Pt of Pd and Pt which are carried by the component of (a-3) is within a range of 4 to 6 or within a range of 18 to 22. The above constitutions can improve an exhaust gas purifying performance.

Rh and Pt may be employed as (b-1) the noble metal, for example. As a compounding ratio of (b-1) the noble metals, it is preferable, for example, to contain Rh without containing Pt, or to contain both Rh and Pt so that a weight ratio Pt/Rh of Pt and Rh in the outside layer b is ⅓ or less. By limiting an amount of Pt to the above range, an exhaust gas purifying performance can be improved.

An inorganic oxide which comprises alumina and/or CeZr compound oxide may be employed as (a-3) the inorganic oxide, for example. (a-3) the inorganic oxide may further include Zr oxide, Ce oxide, silica, titania, and others.

An inorganic oxide which comprises alumina and/or CeZr compound oxide may be employed as (b-2) the inorganic oxide, for example. (b-2) the inorganic oxide may further include Zr oxide, Ce oxide, silica, titania, and others. It is preferable that an amount of Zr contained in the CeZr compound oxide which constitutes (b-2) the inorganic oxide is in a range from 50 to 95 wt % in terms of oxide. By keeping a content rate of Zr within the above range, an exhaust gas purifying performance can be improved.

The above catalyst coating layer may include one or more components selected from a group consisting of Ba, La, Nd, Y, and Pr. These components may be included only in the inside layer a, only in the outside layer b, or in both the inside layer a and the outside layer b, of the catalyst coating layer.

There is no particular limitation to the catalyst substrate as long as the catalyst substrate is the one generally used for an exhaust gas purifying catalyst. For example, a honeycomb substrate, a corrugated substrate, a monolith honeycomb substrate and others may be employed. The catalyst substrate may be made of any refractory material. For example, an integrally structured type of substrate made of refractory ceramics such as cordierite or the like, or of metal such as ferrite stainless steel or the like can be employed.

Figure 1:
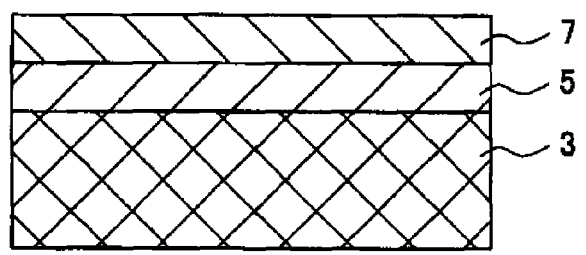
FIG. 1 is an explanatory diagram showing a structure of an exhaust gas purifying catalyst according to Embodiments 1 to 8 and Comparative Examples 1 to 9.

EXPLANATION OF REFERENCE NUMERALS 1, 101 . . . exhaust gas purifying catalyst
3 . . . substrate
5 . . . inside layer
7 . . . outside layer
9 . . . first inside layer
11 . . . second inside layer
13 . . . upstream portion
15 . . . downstream portion

BEST MODE FOR CARRYING OUT THE INVENTION

The present invention will be explained by way of embodiments.

Embodiment 1 a) A description will now be given on a structure of an exhaust gas purifying catalyst 1 of Embodiment 1 with reference to FIG. 1.

The exhaust gas purifying catalyst 1 is configured by forming an inside layer 5 on a surface of a substrate (catalyst substrate) 3, and further forming an outside layer 7 on top of the inside layer 5. The inside layer 5 and the outside layer 7 function as a catalyst coating layer. The substrate 3 is a monolith honeycomb substrate having a capacity of 1.0 L and a cell density of 900 cells/in$^2$. The inside layer 5 and the outside layer 7 are formed on an inner face of each cell of the substrate 3.

The inside layer 5 includes Pt and Pd as noble metals, CeZr compound oxide, and alumina. The CeZr compound oxide has a weight ratio of $CeO_2$ to $ZrO_2$ of 1:4 (a ratio of Ce to Zr in the compound oxide is expressed in terms of weight ratio of $CeO_2$ to $ZrO_2$). Hereinafter, CeZr compound oxide is the same as this, unless otherwise described.

In the inside layer 5, a half of alumina carries Pd and Pt so that a weight ratio Pd/Pt of 5 is obtained, whereas the other alumina carries Pd and Pt so that a weight ratio Pd/Pt of 10 is obtained.

The outside layer 7 includes Rh as a noble metal, CeZr compound oxide, and alumina.

Table 1 shows detailed compositions of the exhaust gas purifying catalyst 1 of Embodiment 1 and later-described Embodiments 2 to 14. In Table 1, each value in parentheses represents mass of the noble metals, whose unit is g, and CZ represents CeZr compound oxide.

TABLE 1

| | | inside layer | | | | outside layer | |
|---|---|---|---|---|---|---|---|
| | configuration | powder material | | | | | |
| | of inside layer | contained in inside layer | noble metal (g) | Pd/Pt | inorganic oxide | noble metal | inorganic oxide |
| Embodiment 1 | one layer | powder material 1 | Pd(0.5), Pt(0.1) | 5 | $Al_2O_3$*, CZ* | Rh(1.0) | $Al_2O_3$*, CZ* |
| | | powder material 2 | Pd(0.5), Pt(0.05) | 10 | | | |
| Embodiment 2 | one layer | powder material 3 | Pd(0.48), Pt(0.12) | 4 | $Al_2O_3$*, CZ* | Rh(1.0) | $Al_2O_3$*, CZ* |
| | | powder material 4 | Pd(0.49), Pt(0.06) | 8.17 | | | |
| Embodiment 3 | one layer | powder material 5 | Pd(0.51), Pt(0.09) | 5.67 | $Al_2O_3$*, CZ* | Rh(1.0) | $Al_2O_3$*, CZ* |
| | | powder material 6 | Pd(0.507), Pt(0.043) | 11.8 | | | |
| Embodiment 4 | one layer | powder material 2 | Pd(0.5), Pt(0.05) | 10 | $Al_2O_3$*, CZ* | Rh(1.0) | $Al_2O_3$*, CZ* |
| | | powder material 7 | Pd(0.571), Pt(0.029) | 19.7 | | | |
| Embodiment 5 | one layer | powder material 2 | Pd(0.5), Pt(0.05) | 10 | $Al_2O_3$*, CZ* | Rh(1.0) | $Al_2O_3$*, CZ* |
| | | powder material 8 | Pd(0.569), Pt(0.031) | 18.4 | | | |
| Embodiment 6 | one layer | powder material 2 | Pd(0.5), Pt(0.05) | 10 | $Al_2O_3$*, CZ* | Rh(1.0) | $Al_2O_3$*, CZ* |
| | | powder material 9 | Pd(0.5739), Pt(0.0261) | 22 | | | |
| Embodiment 7 | one layer | powder material 10 | Pd(0.5), Pt(0.1) | 5 | $Al_2O_3$*, CZ* | Rh(1.0) | $Al_2O_3$*, CZ* |
| | | powder material 11 | Pd(0.5), Pt(0.05) | 10 | | | |
| Embodiment 8 | one layer | powder material 12 | Pd(0.5), Pt(0.1) | 5 | $Al_2O_3$*, CZ* | Rh(1.0) | $Al_2O_3$*, CZ* |
| | | powder material 13 | Pd(0.5), Pt(0.05) | 10 | | | |
| Embodiment 9 | two layers | powder material 2 (upper) | Pd(0.5), Pt(0.05) | 10 | $Al_2O_3$*, CZ* | Rh(1.0) | $Al_2O_3$*, CZ* |
| | | powder material 1 (lower) | Pd(0.5), Pt(0.1) | 5 | $Al_2O_3$*, CZ* | | |
| Embodiment 10 | two layers | powder material 1 (upper) | Pd(0.5), Pt(0.1) | 5 | $Al_2O_3$*, CZ* | Rh(1.0) | $Al_2O_3$*, CZ* |
| | | powder material 2 (lower) | Pd(0.5), Pt(0.05) | 10 | $Al_2O_3$*, CZ* | | |
| Embodiment 11 | two layers | powder material 2 (upper) | Pd(0.5), Pt(0.05) | 10 | $Al_2O_3$*, CZ* | Rh(1.0) | $Al_2O_3$*, CZ* |
| | | powder material 7 (lower) | Pd(0.571), Pt(0.029) | 19.7 | $Al_2O_3$*, CZ* | | |

TABLE 1-continued

|  | inside layer | | | | | outside layer | |
|---|---|---|---|---|---|---|---|
|  | configuration of inside layer | powder material contained in inside layer | noble metal (g) | Pd/Pt | inorganic oxide | noble metal | inorganic oxide |
| Embodiment 12 | upstream portion & | powder material 1 (upstream) | Pd(0.5), Pt(0.1) | 5 | Al$_2$O$_3$*, CZ* | Rh(1.0) | Al$_2$O$_3$*, CZ* |
|  | downstream portion | powder material 2 (downstream) | Pd(0.5), Pt(0.05) | 10 | Al$_2$O$_3$*, CZ* |  |  |
| Embodiment 13 | upstream portion & | powder material 2 (upstream) | Pd(0.5), Pt(0.05) | 10 | Al$_2$O$_3$*, CZ* | Rh(1.0) | Al$_2$O$_3$*, CZ* |
|  | downstream portion | powder material 1 (downstream) | Pd(0.5), Pt(0.1) | 5 | Al$_2$O$_3$*, CZ* |  |  |
| Embodiment 14 | upstream portion & | powder material 7 (upstream) | Pd(0.571), Pt(0.029) | 19.7 | Al$_2$O$_3$*, CZ* | Rh(1.0) | Al$_2$O$_3$*, CZ* |
|  | downstream portion | powder material 2 (downstream) | Pd(0.5), Pt(0.05) | 10 | Al$_2$O$_3$*, CZ* |  |  |

Inorganic oxide carrying noble metal is marked with * b) A description will now be given on a method of manufacturing the exhaust gas purifying catalyst 1 of Embodiment 1.

Firstly, a powder material 1 and a powder material 2 were prepared as below.

(Powder Material 1)

A slurry obtained by mixing 25 g of alumina (fine powder, hereinafter the same), Pd nitrate solution (an amount containing 0.5 g of Pd), and Pt nitrate solution (an amount containing 0.1 g of Pt) was dried at 250° C. for an hour, and after calcined at 500° C. for an hour, it was grinded to prepare 25.6 g of the powder material 1. In the powder material 1, 25 g of alumina carries Pd and Pt so that a weight ratio Pd/Pt of 5 is obtained.

(Powder Material 2)

A slurry obtained by mixing 25 g of alumina, Pd nitrate solution (an amount containing 0.5 g of Pd), and Pt nitrate solution (an amount containing 0.05 g of Pt) was dried at 250° C. for an hour, and after calcined at 500° C. for an hour, it was grinded to prepare 25.55 g of the powder material 2. In the powder material 2, 25 g of alumina carries Pd and Pt so that a weight ratio Pd/Pt of 10 is obtained.

Secondly, a slurry S1 and a slurry S2 were prepared by mixing below listed components.

(Slurry S1)
Powder material 1: 25.6 g
Powder material 2: 25.55 g
CeZr compound oxide: 50 g (Slurry S2)
Alumina: 50 g
CeZr compound oxide: 50 g
Rh nitrate solution: an amount containing 1.0 g of Rh Thirdly, the slurry S1 was applied to coat the entire substrate 3, and after dried at 250° C. for an hour, it was calcined at 500° C. for an hour, to form the inside layer 5. The slurry S2 was further applied to coat the substrate 3 having the slurry S1 previously applied thereon, and after dried at 250° C. for an hour, it was calcined at 500° C. for an hour, to form the outside layer 7. Thus the exhaust gas purifying catalyst 1 was completed by the above processes.

Embodiment 2

The exhaust gas purifying catalyst 1 of Embodiment 2 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 4 is obtained, whereas the other alumina carries Pd and Pt so that a weight ratio Pd/Pt of 8.17 is obtained.

A method of manufacturing the exhaust gas purifying catalyst 1 of Embodiment 2 is basically the same as that of Embodiment 1. However, in Embodiment 2, a slurry S3 was used in place of the slurry S1 as a slurry to form the inside layer 5. A powder material 3 and a powder material 4 were preliminarily prepared, and then the slurry S3 was prepared by mixing below listed components including the powder material 3 and the powder material 4.

(Powder Material 3)

A slurry obtained by mixing 25 g of alumina, Pd nitrate solution (an amount containing 0.48 g of Pd), and Pt nitrate solution (an amount containing 0.12 g of Pt) was dried at 250° C. for an hour, and after calcined at 500° C. for an hour, it was grinded to prepare 25.6 g of the powder material 3. In the powder material 3, 25 g of alumina carries Pd and Pt so that a weight ratio Pd/Pt of 4 is obtained.

(Powder Material 4)

A slurry obtained by mixing 25 g of alumina, Pd nitrate solution (an amount containing 0.49 g of Pd), and Pt nitrate solution (an amount containing 0.06 g of Pt) was dried at 250° C. for an hour, and after calcined at 500° C. for an hour, it was grinded to prepare 25.55 g of the powder material 4. In the powder material 4, 25 g of alumina carries Pd and Pt so that a weight ratio Pd/Pt of 8.17 is obtained.

(Slurry S3)
Powder material 3: 25.6 g
Powder material 4: 25.55 g
CeZr compound oxide: 50 g Embodiment 3

The exhaust gas purifying catalyst 1 of Embodiment 3 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 5.67 is obtained, whereas the other alumina carries Pd and Pt so that a weight ratio Pd/Pt of 11.8 is obtained.

A method of manufacturing the exhaust gas purifying catalyst 1 of Embodiment 3 is basically the same as that of Embodiment 1. However, in Embodiment 3, a slurry S4 was used in place of the slurry S1 as a slurry to form the inside layer 5. A powder material 5 and a powder material 6 were preliminarily prepared, and then the slurry S4 was prepared by mixing below listed components including the powder material 5 and the powder material 6.

(Powder Material 5)

A slurry obtained by mixing 25 g of alumina, Pd nitrate solution (an amount containing 0.51 g of Pd), and Pt nitrate solution (an amount containing 0.09 g of Pt) was dried at 250° C. for an hour, and after calcined at 500° C. for an hour, it was grinded to prepare 25.6 g of the powder material 5. In the powder material 5, 25 g of alumina carries Pd and Pt so that a weight ratio Pd/Pt of 5.67 is obtained.

(Powder Material 6)

A slurry obtained by mixing 25 g of alumina, Pd nitrate solution (an amount containing 0.507 g of Pd), and Pt nitrate solution (an amount containing 0.043 g of Pt) was dried at 250° C. for an hour, and after calcined at 500° C. for an hour, it was grinded to prepare 25.55 g of the powder material 6. In the powder material 6, 25 g of alumina carries Pd and Pt so that a weight ratio Pd/Pt of 11.8 is obtained.

(Slurry S4)
Powder material 5: 25.6 g
Powder material 6: 25.55 g
CeZr compound oxide: 50 g Embodiment 4

The exhaust gas purifying catalyst 1 of Embodiment 4 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 10 is obtained, whereas the other alumina carries Pd and Pt so that a weight ratio Pd/Pt of 19.7 is obtained.

A method of manufacturing the exhaust gas purifying catalyst 1 of Embodiment 4 is basically the same as that of Embodiment 1. However, in Embodiment 4, a slurry S5 was used in place of the slurry S1 as a slurry to form the inside layer 5. A powder material 7 and the powder material 2 were preliminarily prepared, and then the slurry S5 was prepared by mixing below listed components including the powder material 7 and the powder material 2.

(Powder Material 7)

A slurry obtained by mixing 25 g of alumina, Pd nitrate solution (an amount containing 0.571 g of Pd), and Pt nitrate solution (an amount containing 0.029 g of Pt) was dried at 250° C. for an hour, and after calcined at 500° C. for an hour, it was grinded to prepare 25.6 g of the powder material 7. In the powder material 7, 25 g of alumina carries Pd and Pt so that a weight ratio Pd/Pt of 19.7 is obtained.

(Slurry S5)
Powder material 7: 25.6 g
Powder material 2: 25.55 g
CeZr compound oxide: 50 g Embodiment 5

The exhaust gas purifying catalyst 1 of Embodiment 5 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 10 is obtained, whereas the other alumina carries Pd and Pt so that a weight ratio Pd/Pt of 18.4 is obtained.

A method of manufacturing the exhaust gas purifying catalyst 1 of Embodiment 5 is basically the same as that of Embodiment 1. However, in Embodiment 5, a slurry S6 was used in place of the slurry S1 as a slurry to form the inside layer 5. A powder material 8 and the powder material 2 were preliminarily prepared, and then the slurry S6 was prepared by mixing below listed components including the powder material 8 and the powder material 2.

(Powder Material 8)

A slurry obtained by mixing 25 g of alumina, Pd nitrate solution (an amount containing 0.569 g of Pd), and Pt nitrate solution (an amount containing 0.031 g of Pt) was dried at 250° C. for an hour, and after calcined at 500° C. for an hour, it was grinded to prepare 25.6 g of the powder material 8. In the powder material 8, 25 g of alumina carries Pd and Pt so that a weight ratio Pd/Pt of 18.4 is obtained.

(Slurry S6)
Powder material 8: 25.6 g
Powder material 2: 25.55 g
CeZr compound oxide: 50 g Embodiment 6

The exhaust gas purifying catalyst 1 of Embodiment 6 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 10 is obtained, whereas the other alumina carries Pd and Pt so that a weight ratio Pd/Pt of 22 is obtained.

A method of manufacturing the exhaust gas purifying catalyst 1 of Embodiment 6 is basically the same as that of Embodiment 1. However, in Embodiment 6, a slurry S7 was used in place of the slurry S1 as a slurry to form the inside layer 5. A powder material 9 and the powder material 2 were preliminarily prepared, and then the slurry S7 was prepared by mixing below listed components including the powder material 9 and the powder material 2.

(Powder Material 9)

A slurry obtained by mixing 25 g of alumina, Pd nitrate solution (an amount containing 0.5739 g of Pd), and Pt nitrate solution (an amount containing 0.0261 g of Pt) was dried at 250° C. for an hour, and after calcined at 500° C. for an hour, it was grinded to prepare 25.6 g of the powder material 9. In the powder material 9, 25 g of alumina carries Pd and Pt so that a weight ratio Pd/Pt of 22 is obtained.

(Slurry S7)
Powder material 9: 25.6 g
Powder material 2: 25.55 g
CeZr compound oxide: 50 g Embodiment 7

The exhaust gas purifying catalyst 1 of Embodiment 7 has basically the same structure as that of Embodiment 1, but there is a difference in the inside layer 5. Hereinafter, the difference will be mainly described. In the inside layer 5, it is not alumina but CeZr compound oxide that carries Pd and Pt. That is, in the inside layer 5, a half of CeZr compound oxide carries Pd and Pt so that a weight ratio Pd/Pt of 5 is obtained, whereas the other CeZr compound oxide carries Pd and Pt so that a weight ratio Pd/Pt of 10 is obtained.

A method of manufacturing the exhaust gas purifying catalyst 1 of Embodiment 7 is basically the same as that of Embodiment 1. However, in Embodiment 7, a slurry S8 was used in place of the slurry S1 as a slurry to form the inside layer 5. A powder material 10 and a powder material 11 were preliminarily prepared, and then the slurry S8 was prepared by mixing below listed components including the powder material 10 and the powder material 11.

(Powder Material 10)

A slurry obtained by mixing 25 g of CeZr compound oxide, Pd nitrate solution (an amount containing 0.5 g of Pd), and Pt nitrate solution (an amount containing 0.1 g of Pt) was dried at 250° C. for an hour, and after calcined at 500° C. for an hour, it was grinded to prepare 25.6 g of the powder material 10. In the powder material 10, 25 g of CeZr compound oxide carries Pd and Pt so that a weight ratio Pd/Pt of 5 is obtained.

(Powder Material 11)

A slurry obtained by mixing 25 g of CeZr compound oxide, Pd nitrate solution (an amount containing 0.5 g of Pd), and Pt nitrate solution (an amount containing 0.05 g of Pt) was dried at 250° C. for an hour, and after calcined at 500° C. for an hour, it was grinded to prepare 25.55 g of the powder material 11. In the powder material 11, 25 g of CeZr compound oxide carries Pd and Pt so that a weight ratio Pd/Pt of 10 is obtained.

(Slurry S8)
Powder material 10: 25.6 g
Powder material 11: 25.55 g
Alumina: 50 g Embodiment 8

The exhaust gas purifying catalyst 1 of Embodiment 8 has basically the same structure as that of Embodiment 1, but there is a difference in the inside layer 5. Hereinafter, the difference will be mainly described. In the inside layer 5, alumina and CeZr compound oxide carry Pd and Pt. That is, in the inside layer 5, a half of alumina and a half of CeZr compound oxide carry Pd and Pt so that a weight ratio Pd/Pt of 5 is obtained, whereas the other alumina and the other CeZr compound oxide carry Pd and Pt so that a weight ratio Pd/Pt of 10 is obtained.

A method of manufacturing the exhaust gas purifying catalyst 1 of Embodiment 8 is basically the same as that of Embodiment 1. However, in Embodiment 8, a slurry S9 was used in place of the slurry S1 as a slurry to form the inside layer 5. A powder material 12 and a powder material 13 were preliminarily prepared, and then the slurry S9 was prepared by mixing below listed components including the powder material 12 and the powder material 13.

(Powder Material 12)

A slurry obtained by mixing 25 g of alumina, 25 g of CeZr compound oxide, Pd nitrate solution (an amount containing 0.5 g of Pd), and Pt nitrate solution (an amount containing 0.1 g of Pt) was dried at 250° C. for an hour, and after calcined at 500° C. for an hour, it was grinded to prepare 25.6 g of the powder material 12. In the powder material 12, 25 g of alumina and 25 g of CeZr compound oxide carry Pd and Pt so that a weight ratio Pd/Pt of 5 is obtained.

(Powder Material 13)

A slurry obtained by mixing 25 g of alumina, 25 g of CeZr compound oxide, Pd nitrate solution (an amount containing 0.5 g of Pd), and Pt nitrate solution (an amount containing 0.05 g of Pt) was dried at 250° C. for an hour, and after calcined at 500° C. for an hour, it was grinded to prepare 25.55 g of the powder material 13. In the powder material 13, 25 g of alumina and 25 g of CeZr compound oxide carry Pd and Pt so that a weight ratio Pd/Pt of 10 is obtained.

(Slurry S9)
Powder material 12: 50.6 g
Powder material 13: 50.55 g

Figure 2:
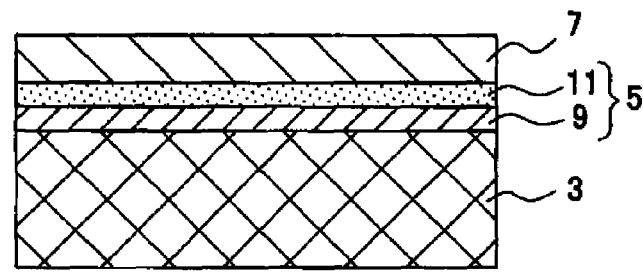
FIG. 2 is an explanatory diagram showing a structure of an exhaust gas purifying catalyst according to Embodiments 9 to 11.

Embodiment 9 a) A description will now be given on a structure of the exhaust gas purifying catalyst 1 of Embodiment 9 with reference to FIG. 2.

The exhaust gas purifying catalyst 1 is configured by forming the inside layer 5 on the surface of the substrate (catalyst substrate) 3, and further forming the outside layer 7 on top of the inside layer 5. The inside layer 5 is further composed of a first inside layer 9 and a second inside layer 11. The inside layer 5 and the outside layer 7 function as a catalyst coating layer. The substrate 3 is the same as that in Embodiment 1.

The first inside layer 9 includes Pt and Pd as noble metals, CeZr compound oxide, and alumina. In the first inside layer 9, alumina carries Pd and Pt so that a weight ratio Pd/Pt of 5 is obtained.

The second inside layer 11 includes Pt and Pd as noble metals, CeZr compound oxide, and alumina. In the second inside layer 11, alumina carries Pd and Pt so that a weight ratio Pd/Pt of 10 is obtained.

The outside layer 7 includes Rh as a noble metal, CeZr compound oxide, and alumina.

b) A description will now be given on a method of manufacturing the exhaust gas purifying catalyst 1 of Embodiment 9.

Firstly, a slurry S10 and a slurry S11 were prepared as below, while the slurry S2 was prepared in the same manner as in Embodiment 1.

(Slurry S10)
Powder material 1: 25.6 g
CeZr compound oxide: 25 g (Slurry S11)
Powder material 2: 25.55 g Secondly, the slurry S10 was applied to coat the entire substrate 3, and after dried at 250° C. for an hour, it was calcined at 500° C. for an hour, to form the first inside layer 9. Then, the slurry S11 was further applied to coat the substrate 3 having the slurry S10 previously applied thereon, and after dried at 250° C. for an hour, it was calcined at 500° C. for an hour, to form the second inside layer 11. Then, the slurry S2 was still further applied to coat the substrate 3 having the slurry S11 previously applied thereon, and after dried at 250° C. for an hour, it was calcined at 500° C. for an hour, to form the outside layer 7. Thus the exhaust gas purifying catalyst 1 was completed by the above processes.

Embodiment 10

The exhaust gas purifying catalyst 1 of Embodiment 10 has basically the same structure as that of Embodiment 9, but there is a difference in the inside layer 5 (the first inside layer 9 and the second inside layer 11). Hereinafter, the difference will be mainly described. In the first inside layer 9, alumina carries Pd and Pt so that a weight ratio Pd/Pt of 10 is obtained. In the second inside layer 11, alumina carries Pd and Pt so that a weight ratio Pd/Pt of 5 is obtained.

A method of manufacturing the exhaust gas purifying catalyst 1 of Embodiment 10 is basically the same as that of Embodiment 9. However, in Embodiment 10, the slurry S11 was used in place of the slurry S10 as a slurry to form the first inside layer 9, and the slurry S10 was used in place of the slurry S11 as a slurry to form the second inside layer 11.

Embodiment 11

The exhaust gas purifying catalyst 1 of Embodiment 11 has basically the same structure as that of Embodiment 9, but there is a difference in the first inside layer 9. Hereinafter, the difference will be mainly described. In the first inside layer 9, alumina carries Pd and Pt so that a weight ratio Pd/Pt of 19.7 is obtained.

A method of manufacturing the exhaust gas purifying catalyst 1 of Embodiment 11 is basically the same as that of Embodiment 9. However, in Embodiment 11, a slurry S12 was used in place of the slurry S10 as a slurry to form the first inside layer 9. The powder material 7 was preliminarily prepared in the same manner as in Embodiment 4, and then the slurry S12 was prepared by mixing below listed components including the powder material 7.

(Slurry S12)
Powder material 7: 25.6 g
CeZr compound oxide: 25 g

Figure 3:
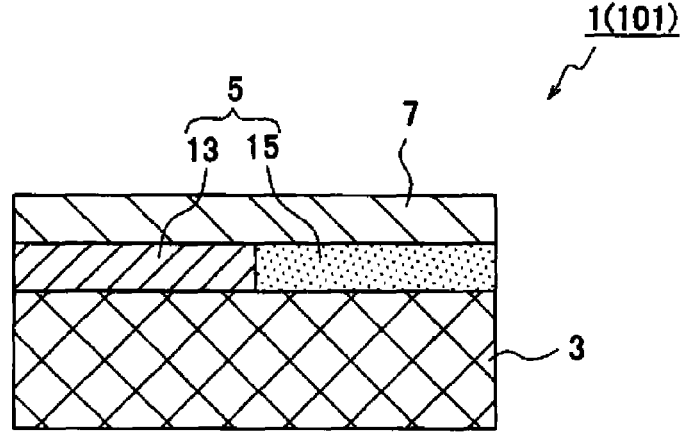
FIG. 3 is an explanatory diagram showing a structure of an exhaust gas purifying catalyst according to Embodiments 12 to 14.

Embodiment 12 a) A description will now be given on a structure of the exhaust gas purifying catalyst 1 of Embodiment 12 with reference to FIG. 3.

The exhaust gas purifying catalyst 1 is configured by forming the inside layer 5 on the surface of the substrate (catalyst substrate) 3, and further forming the outside layer 7 on top of the inside layer 5. The inside layer 5 is further composed of an upstream portion 13 located upstream relative to a flow direction of exhaust gas and a downstream portion 15 located downstream relative to the flow direction of exhaust gas. The inside layer 5 and the outside layer 7 function as a catalyst coating layer. The substrate 3 is the same as that in Embodiment 1.

The upstream portion 13 includes Pt and Pd as noble metals, CeZr compound oxide, and alumina. In the upstream portion 13, alumina carries Pd and Pt so that a weight ratio Pd/Pt of 5 is obtained.

The downstream portion 15 includes Pt and Pd as noble metals, CeZr compound oxide, and alumina. In the downstream portion 15, alumina carries Pd and Pt so that a weight ratio Pd/Pt of 10 is obtained.

The outside layer 7 includes Rh as a noble metal, CeZr compound oxide, and alumina.

b) A description will now be given on a method of manufacturing the exhaust gas purifying catalyst 1 of Embodiment 12.

Firstly, the slurry S10 and the slurry S11 were prepared in the same manner as in Embodiment 9, while the slurry S2 was prepared in the same manner as in Embodiment 1.

Secondly, the slurry S10 was applied to coat an upstream half of the substrate 3, and after dried at 250° C. for an hour, it was calcined at 500° C. for an hour, to form the upstream portion 13. The slurry S11 was applied to coat a downstream half of the substrate 3, and after dried at 250° C. for an hour, it was calcined at 500° C. for an hour, to form the downstream portion 15. Then, the slurry S2 was further applied to coat the entire substrate 3, and after dried at 250° C. for an hour, it was calcined at 500° C. for an hour, to form the outside layer 7. Thus the exhaust gas purifying catalyst 1 was completed by the above processes.

Embodiment 13

The exhaust gas purifying catalyst 1 of Embodiment 13 has basically the same structure as that of Embodiment 12, but there is a difference in the inside layer 5 (the upstream portion 13 and the downstream portion 15). Hereinafter, the difference will be mainly described. In the upstream portion 13, alumina carries Pd and Pt so that a weight ratio Pd/Pt of 10 is obtained. In the downstream portion 15, alumina carries Pd and Pt so that a weight ratio Pd/Pt of 5 is obtained.

A method of manufacturing the exhaust gas purifying catalyst 1 of Embodiment 13 is basically the same as that of Embodiment 12. However, in Embodiment 13, the slurry S11 was used in place of the slurry S10 as a slurry to form the upstream portion 13, and the slurry S10 was used in place of the slurry S11 as a slurry to form the downstream portion 15.

Embodiment 14

The exhaust gas purifying catalyst 1 of Embodiment 14 has basically the same structure as that of Embodiment 12, but there is a difference in the upstream portion 13. Hereinafter, the difference will be mainly described. In the upstream portion 13, alumina carries Pd and Pt so that a weight ratio Pd/Pt of 19.7 is obtained.

A method of manufacturing the exhaust gas purifying catalyst 1 of Embodiment 14 is basically the same as that of Embodiment 12. However, in Embodiment 14, the slurry S12, which was prepared in the same manner as in Embodiment 11, was used in place of the slurry S10 as a slurry to form the upstream portion 13.

COMPARATIVE EXAMPLE 1

An exhaust gas purifying catalyst 101 of Comparative Example 1 has basically the same structure as that of Embodiment 1, but there is a difference in the inside layer 5. Hereinafter, the difference will be mainly described. The inside layer 5 includes Pd alone as a noble metal, which is carried by alumina.

Table 2 shows detailed compositions of the exhaust gas purifying catalyst 101 of Comparative Example 1 and later-described Comparative Examples 2 to 9. In Table 2, each value in parentheses represents mass of the noble metals, whose unit is g, and CZ represents CeZr compound oxide.

TABLE 2

| | | inside layer | | | | outside layer | |
|---|---|---|---|---|---|---|---|
| | configuration of inside layer | powder material contained in inside layer | noble metal (g) | Pd/Pt | inorganic oxide | noble metal | inorganic oxide |
| Comp. Ex. 1 | one layer | powder material 14 | Pd(1.15) | — | Al$_2$O$_3$*, CZ* | Rh(1.0) | Al$_2$O$_3$*, CZ* |
| Comp. Ex. 2 | one layer | powder material 15 | Pd(1.0), Pt(0.15) | 6.67 | Al$_2$O$_3$*, CZ* | Rh(1.0) | Al$_2$O$_3$*, CZ* |
| Comp. Ex. 3 | one layer | powder material 16 | Pd(0.96), Pt(0.19) | 5.05 | Al$_2$O$_3$*, CZ* | Rh(1.0) | Al$_2$O$_3$*, CZ* |
| Comp. Ex. 4 | one layer | powder material 17 | Pd(1.05), Pt(0.1) | 10.5 | Al$_2$O$_3$*, CZ* | Rh(1.0) | Al$_2$O$_3$*, CZ* |
| Comp. Ex. 5 | one layer | powder material 18 | Pd(0.45), Pt(0.15) | 3 | Al$_2$O$_3$*, CZ* | Rh(1.0) | Al$_2$O$_3$*, CZ* |
| | | powder material 19 | Pd(0.48), Pt(0.07) | 6.86 | Al$_2$O$_3$*, CZ* | | |
| Comp. Ex. 6 | one layer | powder material 20 | Pd(0.52), Pt(0.08) | 6.5 | Al$_2$O$_3$*, CZ* | Rh(1.0) | Al$_2$O$_3$*, CZ* |
| | | powder material 21 | Pd(0.51), Pt(0.04) | 12.8 | Al$_2$O$_3$*, CZ* | | |
| Comp. Ex. 7 | one layer | powder material 22 | Pd(0.567), Pt(0.033) | 17.2 | Al$_2$O$_3$*, CZ* | Rh(1.0) | Al$_2$O$_3$*, CZ* |
| | | powder material 2 | Pd(0.5), Pt(0.05) | 10 | Al$_2$O$_3$*, CZ* | | |
| Comp. Ex. 8 | one layer | powder material 23 | Pd(0.575), Pt(0.025) | 23 | Al$_2$O$_3$*, CZ* | Rh(1.0) | Al$_2$O$_3$*, CZ* |
| | | powder material 2 | Pd(0.5), Pt(0.05) | 10 | Al$_2$O$_3$*, CZ* | | |
| Comp. Ex. 9 | one layer | powder material 24 | Pd(1.055), Pt(0.055) | 19.2 | Al$_2$O$_3$*, CZ* | Rh(1.0) | Al$_2$O$_3$*, CZ* |

Inorganic oxide carrying noble metal is marked with *

A method of manufacturing the exhaust gas purifying catalyst 101 of Comparative Example 1 is basically the same as that of Embodiment 1. However, in Comparative Example 1, a slurry S13 was used in place of the slurry S1 as a slurry to form the inside layer 5. A powder material 14 was preliminarily prepared, and then the slurry S13 was prepared by mixing below listed components including the powder material 14.

(Powder material 14)

A slurry obtained by mixing 50 g of alumina and Pd nitrate solution (an amount containing 1.15 g of Pd) was dried at 250-C. for an hour, and after calcined at 500-C. for an hour, it was grinded to prepare 51.15 g of the powder material 14. In the powder material 14, 50 g of alumina carries Pd.

(Slurry S13)
Powder material 14: 51.15 g
CeZr compound oxide: 50 g

COMPARATIVE EXAMPLE 2

The exhaust gas purifying catalyst 101 of Comparative Example 2 has basically the same structure as that of Embodiment 1, but there is a difference in the inside layer 5. Hereinafter, the difference will be mainly described. In the inside layer 5, alumina carries Pd and Pt so that a uniform weight ratio Pd/Pt of 6.67 is obtained.

A method of manufacturing the exhaust gas purifying catalyst 101 of Comparative Example 2 is basically the same as that of Embodiment 1. However, in Comparative Example 2, a slurry S14 was used in place of the slurry S1 as a slurry to form the inside layer 5. A powder material 15 was preliminarily prepared, and then the slurry S14 was prepared by mixing below listed components including the powder material 15.

(Powder Material 15)

A slurry obtained by mixing 50 g of alumina, Pd nitrate solution (an amount containing 1.0 g of Pd), and Pt nitrate solution (an amount containing 0.15 g of Pt) was dried at 250° C. for an hour, and after calcined at 500° C. for an hour, it was grinded to prepare 51.15 g of the powder material 15. In the powder material 15, 50 g of alumina carries Pd and Pt so that a weight ratio Pd/Pt of 6.67 is obtained.

(Slurry S14)
Powder material 15: 51.15 g
CeZr compound oxide: 50 g

COMPARATIVE EXAMPLE 3

The exhaust gas purifying catalyst 101 of Comparative Example 3 has basically the same structure as that of Embodiment 1, but there is a difference in the inside layer 5. Hereinafter, the difference will be mainly described. In the inside layer 5, alumina carries Pd and Pt so that a uniform weight ratio Pd/Pt of 5.05 is obtained.

A method of manufacturing the exhaust gas purifying catalyst 101 of Comparative Example 3 is basically the same as that of Embodiment 1. However, in Comparative Example 3, a slurry S15 was used in place of the slurry S1 as a slurry to form the inside layer 5. A powder material 16 was preliminarily prepared, and then the slurry S15 was prepared by mixing below listed components including the powder material 16.

(Powder Material 16)

A slurry obtained by mixing 50 g of alumina, Pd nitrate solution (an amount containing 0.96 g of Pd), and Pt nitrate solution (an amount containing 0.19 g of Pt) was dried at 250° C. for an hour, and after calcined at 500° C. for an hour, it was grinded to prepare 51.15 g of the powder material 16. In the powder material 16, 50 g of alumina carries Pd and Pt so that a weight ratio Pd/Pt of 5.05 is obtained.

(Slurry S15)
Powder material 16: 51.15 g
CeZr compound oxide: 50 g

COMPARATIVE EXAMPLE 4

The exhaust gas purifying catalyst 101 of Comparative Example 4 has basically the same structure as that of Embodiment 1, but there is a difference in the inside layer 5. Hereinafter, the difference will be mainly described. In the inside layer 5, alumina carries Pd and Pt so that a uniform weight ratio Pd/Pt of 10.5 is obtained.

A method of manufacturing the exhaust gas purifying catalyst 101 of Comparative Example 4 is basically the same as that of Embodiment 1. However, in Comparative Example 4, a slurry S16 was used in place of the slurry S1 as a slurry to form the inside layer 5. A powder material 17 was preliminarily prepared, and then the slurry S16 was prepared by mixing below listed components including the powder material 17.

(Powder Material 17)

A slurry obtained by mixing 50 g of alumina, Pd nitrate solution (an amount containing 1.05 g of Pd), and Pt nitrate solution (an amount containing 0.10 g of Pt) was dried at 250° C. for an hour, and after calcined at 500° C. for an hour, it was grinded to prepare 51.15 g of the powder material 17. In the powder material 17, 50 g of alumina carries Pd and Pt so that a weight ratio Pd/Pt of 10.5 is obtained.

(Slurry S16)
Powder material 17: 51.15 g
CeZr compound oxide: 50 g

COMPARATIVE EXAMPLE 5

The exhaust gas purifying catalyst 101 of Comparative Example 5 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 3 is obtained, whereas the other alumina carries Pd and Pt so that a weight ratio Pd/Pt of 6.86 is obtained.

A method of manufacturing the exhaust gas purifying catalyst 101 of Comparative Example 5 is basically the same as that of Embodiment 1. However, in Comparative Example 5, a slurry S17 was used in place of the slurry S1 as a slurry to form the inside layer 5. A powder material 18 and a powder material 19 were preliminarily prepared, and then the slurry S17 was prepared by mixing below listed components including the powder material 18 and the powder material 19.

(Powder Material 18)

A slurry obtained by mixing 25 g of alumina, Pd nitrate solution (an amount containing 0.45 g of Pd), and Pt nitrate solution (an amount containing 0.15 g of Pt) was dried at 250° C. for an hour, and after calcined at 500° C. for an hour, it was grinded to prepare 25.6 g of the powder material 18. In the powder material 18, 25 g of alumina carries Pd and Pt so that a weight ratio Pd/Pt of 3 is obtained.

(Powder Material 19)

A slurry obtained by mixing 25 g of alumina, Pd nitrate solution (an amount containing 0.48 g of Pd), and Pt nitrate solution (an amount containing 0.07 g of Pt) was dried at 250° C. for an hour, and after calcined at 500° C. for an hour, it was grinded to prepare 25.55 g of the powder material 19. In the powder material 19, 25 g of alumina carries Pd and Pt so that a weight ratio Pd/Pt of 6.86 is obtained.

(Slurry S17)
Powder material 18: 25.6 g
Powder material 19: 25.55 g
CeZr compound oxide: 50 g

COMPARATIVE EXAMPLE 6

The exhaust gas purifying catalyst 101 of Comparative Example 6 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 6.5 is obtained, whereas the other alumina carries Pd and Pt so that a weight ratio Pd/Pt of 12.8 is obtained.

A method of manufacturing the exhaust gas purifying catalyst 101 of Comparative Example 6 is basically the same as that of Embodiment 1. However, in Comparative Example 6, a slurry S18 was used in place of the slurry S1 as a slurry to form the inside layer 5. A powder material 20 and a powder material 21 were preliminarily prepared, and then the slurry S18 was prepared by mixing below listed components including the powder material 20 and the powder material 21.

(Powder Material 20)

A slurry obtained by mixing 25 g of alumina, Pd nitrate solution (an amount containing 0.52 g of Pd), and Pt nitrate solution (an amount containing 0.08 g of Pt) was dried at 250° C. for an hour, and after calcined at 500° C. for an hour, it was grinded to prepare 25.6 g of the powder material 20. In the powder material 20, 5 g of alumina carries Pd and Pt so that a weight ratio Pd/Pt of 6.5 is obtained.

(Powder Material 21)

A slurry obtained by mixing 25 g of alumina, Pd nitrate solution (an amount containing 0.51 g of Pd), and Pt nitrate solution (an amount containing 0.04 g of Pt) was dried at 250° C. for an hour, and after calcined at 500° C. for an hour, it was grinded to prepare 25.55 g of the powder material 21. In the powder material 21, 25 g of alumina carries Pd and Pt so that a weight ratio Pd/Pt of 12.8 is obtained.

(Slurry S18)
Powder material 20: 25.6 g
Powder material 21: 25.55 g
CeZr compound oxide: 50 g

COMPARATIVE EXAMPLE 7

The exhaust gas purifying catalyst 101 of Comparative Example 7 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 17.2 is obtained, whereas the other alumina carries Pd and Pt so that a weight ratio Pd/Pt of 10 is obtained.

A method of manufacturing the exhaust gas purifying catalyst 101 of Comparative Example 7 is basically the same as that of Embodiment 1. However, in Comparative Example 7, a slurry S19 was used in place of the slurry S1 as a slurry to form the inside layer 5. A powder material 22 and the powder material 2 were preliminarily prepared, and then the slurry S19 was prepared by mixing below listed components including the powder material 22 and the powder material 2.

(Powder Material 22)

A slurry obtained by mixing 25 g of alumina, Pd nitrate solution (an amount containing 0.567 g of Pd), and Pt nitrate solution (an amount containing 0.033 g of Pt) was dried at 250° C. for an hour, and after calcined at 500° C. for an hour, it was grinded to prepare 25.6 g of the powder material 22. In the powder material 22, 25 g of alumina carries Pd and Pt so that a weight ratio Pd/Pt of 17.2 is obtained.

(Slurry S19)
Powder material 22: 25.6 g
Powder material 2: 25.55 g
CeZr compound oxide: 50 g

COMPARATIVE EXAMPLE 8

The exhaust gas purifying catalyst 101 of Comparative Example 8 has basically the same structure as that of Embodiment 1, but there is a difference in the inside layer 5. Hereinafter, the difference will be mainly described. In the inside layer 5, a half of alumina carries Pd and Pt so that a weight ratio Pd/Pt of 23 is obtained, whereas the other alumina carries Pd and Pt so that a weight ratio Pd/Pt of 10 is obtained.

A method of manufacturing the exhaust gas purifying catalyst 101 of Comparative Example 8 is basically the same as that of Embodiment 1. However, in Comparative Example 8, a slurry S20 was used in place of the slurry S1 as a slurry to form the inside layer 5. A powder material 23 and the powder material 2 were preliminarily prepared, and then the slurry S20 was prepared by mixing below listed components including the powder material 23 and the powder material 2.

(Powder Material 23)

A slurry obtained by mixing 25 g of alumina, Pd nitrate solution (an amount containing 0.575 g of Pd), and Pt nitrate solution (an amount containing 0.025 g of Pt) was dried at 250° C. for an hour, and after calcined at 500° C. for an hour, it was grinded to prepare 25.6 g of the powder material 23. In the powder material 23, 25 g of alumina carries Pd and Pt so that a weight ratio Pd/Pt of 23 is obtained.

(Slurry S20)
Powder material 23: 25.6 g
Powder material 2: 25.55 g
CeZr compound oxide: 50 g

COMPARATIVE EXAMPLE 9

The exhaust gas purifying catalyst 101 of Comparative Example 9 has basically the same structure as that of Embodiment 1, but there is a difference in the inside layer 5. Hereinafter, the difference will be mainly described. In the inside layer 5, alumina carries Pd and Pt so that a uniform weight ratio Pd/Pt of 19.2 is obtained.

A method of manufacturing the exhaust gas purifying catalyst 101 of Comparative Example 9 is basically the same as that of Embodiment 1. However, in Comparative Example 9, a slurry S21 was used in place of the slurry S1 as a slurry to form the inside layer 5. A powder material 24 was preliminarily prepared, and then the slurry S21 was prepared by mixing below listed components including a powder material 24.

(Powder Material 24)

A slurry obtained by mixing 50 g of alumina, Pd nitrate solution (an amount containing 1.055 g of Pd), and Pt nitrate solution (an amount containing 0.055 g of Pt) was dried at 250° C. for an hour, and after calcined at 500° C. for an hour, it was grinded to prepare 51.15 g of the powder material 24. In the powder material 24, 50 g of alumina carries Pd and Pt so that a weight ratio Pd/Pt of 19.2 is obtained.

(Slurry S21)
Powder material 24: 51.15 g
CeZr compound oxide: 50 g

Now, a description will be given on a test carried out to examine catalytic performance of each of the exhaust gas purifying catalyst 1 manufactured in Embodiments 1 to 14.

The exhaust gas purifying catalyst 1 (101) obtained in each of Embodiments 1 through 14 and Comparative Examples 1 through 9 was mounted on an actual vehicle having an engine of 2.0 L displacement after conducting an endurance running corresponding to 80,000 km run. Then, HC, CO and NOx emissions were measured after 11 mode running. The 11 mode is a test condition established by the Ministry of Land, Infrastructure, Transport and Tourism in Japan for use in an emission certification test. The other test condition is as below.

(Test Condition)
Mounting position of the catalyst: immediately beneath the engine.
Table 3 shows the results.

TABLE 3

|  | HC emission (g/test) | CO emission (g/test) | NOx emission (g/test) |
| --- | --- | --- | --- |
| Embodiment 1 | 0.44 | 4.46 | 0.36 |
| Embodiment 2 | 0.46 | 4.88 | 0.35 |
| Embodiment 3 | 0.43 | 4.90 | 0.38 |
| Embodiment 4 | 0.43 | 4.80 | 0.37 |
| Embodiment 5 | 0.45 | 4.83 | 0.38 |
| Embodiment 6 | 0.46 | 4.86 | 0.38 |
| Embodiment 7 | 0.45 | 4.82 | 0.37 |
| Embodiment 8 | 0.46 | 4.89 | 0.38 |
| Embodiment 9 | 0.45 | 4.83 | 0.35 |
| Embodiment 10 | 0.46 | 4.92 | 0.38 |
| Embodiment 11 | 0.45 | 4.89 | 0.36 |
| Embodiment 12 | 0.46 | 4.85 | 0.37 |
| Embodiment 13 | 0.44 | 4.89 | 0.36 |
| Embodiment 14 | 0.45 | 4.90 | 0.38 |
| Comp. Ex. 1 | 0.52 | 5.21 | 0.50 |
| Comp. Ex. 2 | 0.51 | 5.05 | 0.47 |
| Comp. Ex. 3 | 0.55 | 5.12 | 0.48 |
| Comp. Ex. 4 | 0.50 | 5.18 | 0.49 |
| Comp. Ex. 5 | 0.57 | 5.30 | 0.50 |
| Comp. Ex. 6 | 0.55 | 5.22 | 0.52 |
| Comp. Ex. 7 | 0.53 | 5.38 | 0.49 |
| Comp. Ex. 8 | 0.52 | 5.20 | 0.50 |
| Comp. Ex. 9 | 0.54 | 5.20 | 0.46 |

As shown in Table 3, the exhaust gas purifying catalyst 1 according to each of Embodiments 1 through 14 excels in catalytic performance in any of HC, CO, and NOx emission, as compared to the exhaust gas purifying catalyst 101 of each Comparative Examples.

It is to be understood that the present invention should not be limited to the above described embodiments, but may be practiced in various forms within the scope not departing from the present invention.

For example, in Embodiments 1 through 14, the outside layer 7 may include Pt so that a weight ratio Pt/Rh of Pt and Rh is 1/3 or less.

Also, the inside layer 5 and/or the outside layer 7 may include one or more components selected from a group consisting of Ba, La, Nd, Y, and Pr.

The invention claimed is:

1. An exhaust gas purifying catalyst comprising:
a catalyst substrate; and
a catalyst coating layer formed on the catalyst substrate, the catalyst coating layer having a layered structure including: an inside layer a comprising an upstream portion located upstream relative to a flow direction of exhaust gas and a downstream portion located downstream relative to the flow direction of exhaust gas, the inside layer a containing (a-1) Pd, (a-2) Pt, and (a-3) an inorganic oxide; and an outside layer b, which covers both the upstream portion and the downstream portion of the inside layer, the outside layer b containing (b-1) a noble metal and (b-2) an inorganic oxide,
wherein a part of (a-3) the inorganic oxide carries Pd and Pt so that a weight ratio Pd/Pt is within a range of 8 to 12, whereas the other part of (a-3) the inorganic oxide carries Pd and Pt so that a weight ratio Pd/Pt is within a range of 4 to 6 or within a range of 18 to 22, and
in either of the upstream portion or the downstream portion, a weight ratio Pd/Pt, of Pd and Pt which is carried by he component of (a-3), is within a range of 8 to 12, whereas in the other one of the upstream portion and the downstream portion, a weight ratio Pd/Pt, of Pd and Pt which is carried by the component of (a-3), is within a range of 4 to 6 or within a range of 18 to 22.

2. The exhaust gas purifying catalyst according to claim 1, wherein the outside layer b includes Rh as (b-1) the noble metal.

3. The exhaust gas purifying catalyst according to claim 2, wherein the outside layer b does not include Pt; or includes Pt so that a weight ratio Pt/Rh of Pt and Rh is ⅓ or less in the outside layer b.

4. The exhaust gas purifying catalyst according to claim 1, wherein (a-3) the inorganic oxide comprises alumina and/or CeZr compound oxide.

5. The exhaust gas purifying catalyst according to claim 1, wherein (b-2) the inorganic oxide comprises alumina and/or CeZr compound oxide.

6. The exhaust gas purifying catalyst according to claim 5, wherein (b-2) the inorganic oxide includes CeZr compound oxide, and an amount of Zr contained in the CeZr compound oxide is in a range from 50 to 95 wt% in terms of oxide.

7. The exhaust gas purifying catalyst according to claim 1, wherein the catalyst coating layer includes one or more components selected from a group consisting of Ba, La, Nd, Y, and Pr.

8. The exhaust gas purifying catalyst according to claim 1, wherein the upstream portion of the inside layer a comprises a composition which is distinct from a composition of the downstream portion of the inside layer a.

9. The exhaust gas purifying catalyst according to claim 1, wherein the Pd/Pt weight ratio of the upstream portion is distinct from the Pd/Pt weight ratio of the downstream portion.

\* \* \* \* \*